3,322,714
VINYL ACETATE-CONTAINING COMPOSITIONS FOR SPLICING SHEET MATERIALS
Wilhelm N. Martin, Grand'Mere, Quebec, Canada, assignor to Consolidated Paper (Bahamas) Limited, Nassau, Bahamas
No Drawing. Filed Aug. 31, 1964, Ser. No. 393,352
6 Claims. (Cl. 260—31.8)

This invention relates to a process for preparing polyvinyl acetate resin compositions and to heat hardenable adhesive films prepared therefrom, such films when cured, being heat resistant and, if desired, water dispersible. These films are useful in the splicing of the lapped ends of paper webs and the like.

It has heretofore been proposed to produce a heat hardenable polyvinyl acetate film using an unmodified polyvinyl acetate resin and a metal halide as a curing agent. A disadvantage of such a film is that, when employed to form a splice, the film or splice becomes sufficiently discolored to make it highly objectionable to those who require a substantially undetectable splice. Furthermore, this film is not water dispersible. Moreover, the use of some metal halides as curing agents results in excessively long curing periods, while still others tend to gel the resin solution very rapidly at room temperature.

Properties of heat resistance and water dispersibility are becoming increasingly important wherever these splicing films are used in the paper and printing industries. Printing processes involving a relatively high temperature ink drying step, require that the paper splices be such that they will withstand these drying temperatures. The repulping of used or unused paper for re-use in the paper making process requires that the paper splice be water dispersible so as to simplify the reclamation process.

An object of the present invention is to provide a heat hardenable polyvinyl acetate splicing composition which when cured possesses improved heat resistant properties and which is not subject to discoloration.

Another object is to provide a heat hardenable polyvinyl acetate splicing film which when cured is highly heat resistant and water dispersible.

Another object is to provide a process for preparing heat hardenable polyvinyl acetate splicing films which when cured are heat resistant and which may be also water dispersible.

In accordance with the invention a modified polyvinyl acetate is dissolved in a suitable organic solvent such as methanol, ethanol, methyl ethyl ketone, benzene, ethyl acetate. Preferably, this modified polyvinyl acetate resin is of carboxylated type. Suitable commercially available carboxylated polyvinyl acetate resins are those known under the trade name "Gelva C-3" and "Gelva C-5" of Monsanto Chemical Company. These are copolymers of vinyl acetate and crotonic acid. They are modified vinyl acetate resins which have been carbonized to such degree that they can be dissolved or dispersed in alkali solutions. These resins have viscosities in the range of 9 to 33 centipoises. The preferred solvents are the lower alcohols such as methanol and ethanol.

A curing agent containing a multivalent metal, and preferably a compound in which the anion is associated with a weak acid, is employed. The curing agent may be dissolved in the modified polyvinyl acetate solution in an amount equal to 2 to 10% by weight of the polyvinyl acetate.

Examples of suitable curing agents are aluminum acetate, aluminum nitrate, aluminum sulphate, ammonium bichromate, chromium acetate, chromium chloride, chromium nitrate, chromium trioxide, ferric oxalate, ferric chloride, and ferric citrate. Chromium acetate is the preferred curing agent.

A plasticizer is added to the solution. The plasticizer may be of the usual type and may be selected from the group comprising dibutyl phthalate; a polyglycol such as polyethylene glycol di(2-ethylhexoate), methoxypolyethylene glycol, and triethylene glycol di(2-ethylbutyrate); also butyl phthalyl, butyl glycolate; butyl ricinoleate; and glyceryl triacetate.

The resulting casting solution has a preferred concentration in the range of 15–50% by weight of total nonvolatile material.

For the production of a film, the resulting solution is cast upon a smooth surface as a thin layer which, on drying, results in a film which may be readily peeled off the surface. The solvent is evaporated at a temperature of the order of 250° F. (or lower) to leave the dried film.

The film, produced as described and used as hereinafter described, is heat resistant to a temperature of the order of 400° F.

The water dispersibility of the film may be increased to any desired degree by adding to the solution sodium hydroxide in an amount of 2 to 10% by weight of the modified polyvinyl acetate. Additions of NaOH beyond 10% renders the resulting film susceptible to conditions of high humidity, under which conditions the film will soften and become difficult to handle.

In some cases, the film may be cast directly upon a paper surface, which has been coated or treated to give a smooth surface from which the film may be freely peeled after it has dried. Thus, after drying, the film may be peeled from the casting surface, packaged with an interleaving layer of paper (preferably repulpable), cut into desired shapes and sizes, placed in any additional packaging means, and marketed. After the film has been peeled off from the coated or treated paper, this paper may be re-wound for re-use in further coating operations; alternatively, this coated or treated paper may be used directly in the packaging of the film as the interleaving material. Examples of such a casting surface are polyethylene coated kraft paper, silicone treated paper and KVP paper (emulsified bleached parch-kraft paper).

In other cases, the film may be cast directly upon a smooth, flexible, travelling, endless belt, from which it may be peeled after it has dried and packaged in a manner similar to that described above. Such an endless belt may be made of metal or plastic.

When using the film in a splicing operation, it is peeled from its packaging surface, placed as an interlayer between the two surfaces to the adhesively secured or spliced together, and heated to a curing temperature of about 325–475° F. under slight pressure for sufficient time for the bonding action to take place. For instance, the heat and pressure may be applied by means of a hand iron.

It will be appreciated that the casting solution as described may be supplied directly to the user who may employ it to produce the splicing film in situ. In some instances, it may be desirable to supply the curing agent in a separate container for addition to the solution just before use.

The following examples are illustrative of the invention:

*Example I*

A solution containing the following ingredients was prepared at room temperature:

Parts by wt. (dry solids)
Carboxylated polyvinyl acetate (Gelva C-3, V-20) _____ g__ 12
Dibutyl phthalate _____ g__ 1.2
Chromium acetate (added, for example, in the form of a 30% (weight/volume) aqueous solution) _____ g__ 0.30
Methanol _____ ml__ 25

The above solution was cast on a polyethylene coated kraft paper and dried under heat lamps at a temperature in the order of 250° F. to a film thickness of 1.0 mil. The film was found effective in splicing such materials as newsprint, kraft paper, glossy or heavily filled and coated papers, aluminum foil, etc. Splices were made at an ironing temperature of between 375°–425° F. Even if ironing was prolonged there was little or no discoloration of the splice. When the heat resistance of the splice was tested by the test procedure described later, the splice did not fail, in fact, the paper began to char while the splice was still intact.

If an unmodified polyvinyl acetate resin is substituted for the above carboxylated resin, in Example I, the heat resistance of a splice made with the resulting film will be much lower. If, however, chromium chloride is also substituted for the chromium acetate, while the heat resistance of the splice will be increased, the splice will become discolored. Similarly, if the chromium acetate is left out of the above formulation (Example I) the heat resistance of the splice will also be much lower; it will, however, be water dispersible in aqueous solutions which are mildly alkaline.

*Example II*

| | Parts by wt. (dry solids) |
|---|---|
| Carboxylated polyvinyl acetate (Gelva C-3, V-20) _____g-- | 12 |
| Dibutyl phthalate _____g-- | 1.2 |
| Chromium acetate (added, for example, in the form of a 30% (weight/volume) aqueous solution) _____g-- | 0.21 |
| Sodium hydroxide (added, for example, in the form of a 16% (weight/volume) aqueous solution) _____g-- | 0.39 |
| Methanol _____ml-- | 23 |
| Water (additional to (1) and (2)) _____ml-- | 2 |

The heat resistance of a splice made with this film on paper is over 400° F. If the chromium acetate is left out, a film will result which will be water dispersible but will be heat resistant only to about 250° F. for prolonged periods.

The above solution was cast on a polyethylene coated kraft paper surface and the film dried and tested. The results were similar to that indicated under Example I, except that in addition the film was water dispersible to a high degree.

Table I shows results using various curing agents while employing the other ingredients and the same proportions set forth in Example I.

The following test procedure was employed to measure heat resistance.

Two strip heater (250 watts, known under the trade name "Chromalox") were set approximately 1 inch apart; the heaters were connected to an auto-transformer, for temperature control; two strips of paper (1" wide) which had been spliced together (as hereinafter described) by a ⅝" high x 1" wide piece of the splicing film to be tested were suspended such that one strip was held from above so that the splice was centered between the two strip heaters and the other strip was pulled from below by a 1 kg. weight attached to it; a thermometer placed close to the splice indicated the temperature condition; the temperature between the heaters in the region of the splice was approximately 400° F., the time for the splice to yield (i.e. for the weight to drop) was measured with a stop watch. The term "slight" heat resistance in above table covers a range of a few seconds to approximately 20 seconds; the term "good" indicates a heat resistance of over 60 seconds.

I claim:

1. A composition for splicing sheet material which consists essentially of a solution of a copolymer of vinyl acetate and crotonic acid, a plasticizer, and a curing agent selected from the group consisting of aluminum acetate, aluminum nitrate, aluminum sulphate, ammonium bichromate, chromium acetate, chromium chloride, chromium nitrate, chromium trioxide, ferric oxalate, ferric chloride, and ferric citrate, said composition containing 15% to 50% total non-volatile material.

2. A composition for splicing sheet material as defined in claim 1, wherein the solvent in said solution is selected from the group consisting of methanol and ethanol.

3. A composition for splicing sheet material as defined in claim 1, wherein said plasticizer is dibutyl phthalate.

4. A composition for splicing sheet material as defined in claim 1, wherein said curing agent is present in an amount of 2% to 10% by weight of said resin.

5. A method of making a heat resistant sheet material splicing film which comprises forming a composition consisting essentially of a solution of a copolymer of vinyl acetate and crotonic acid in a solvent selected from the group consisting of methanol, ethanol, methyl ethyl ketone, benzene, and ethyl acetate, a curing agent in an amount of 2% to 10% by weight of said resin, said curing agent being selected from the group consisting of aluminum acetate, aluminum nitrate, aluminum sulphate, ammonium bichromate, chromium acetate, chromium chloride, chromium nitrate, chromium trioxide,

TABLE I

| Compound | Splice | | Discoloration |
|---|---|---|---|
| | Amount used, mg. | Heat Resistance at 400° F. | |
| Aluminum Acetate | 300 | Slight | Slight. |
| | 600 | do | Do. |
| Aluminum Nitrate | 180 | do | Do. |
| | 240 | Good | Do. |
| Aluminum Chloride | 300 | Resin gelled instantly. | |
| Aluminum Sulphate | 200 | Slight | Do. |
| Ammonium Bichromate | 200 | Good | Brown. |
| Chromium Acetate | 300 | do | Very slight. |
| Chromium Chloride | 400 | do | Yellow-brown. |
| Chromium Nitrate | 300 | Slight | Slight. |
| | 360 | Good | Do. |
| Chromium Trioxide | 180 | do | Light brown. |
| | 300 | do | Do. |
| Ferric Nitrate | 180 | Resin gelled instantly. | |
| Ferric Oxalate | 300 | Slight | Slight. |
| Ferric Chloride | 180 | Good | Very dark. |
| | 300 | do | Do. |
| Ferric Citrate | 300 | Slight | Slight. | ferric oxalate, ferric chloride, and ferric citrate, and a plasticizer, said composition containing a total of 15% to 50% non-volatile material, casting said composition as a thin layer on a smooth surface, allowing said layer to dry, and peeling the dried layer from said surface.

6. A method of making a heat resistant sheet material splicing film as defined in claim 5, wherein said smooth surface comprises the surface of a plastic composition coating on a paper sheet.

References Cited

UNITED STATES PATENTS

| 2,424,110 | 7/1947 | Morrison et al. | 260—33.4 |
| 3,092,600 | 6/1963 | Ozawa et al. | 260—85.7 |
| 3,100,775 | 8/1963 | Ehrlich | 260—33.4 |

MORRIS LIEBMAN, *Primary Examiner.*

L. T. JACOBS, *Assistant Examiner.*